(12) United States Patent
Ejima

(10) Patent No.: US 6,862,332 B2
(45) Date of Patent: Mar. 1, 2005

(54) CLOCK REPRODUCTION CIRCUIT

(75) Inventor: Ken'ichi Ejima, Kobe (JP)

(73) Assignee: TOA Corporation, Kobe (JP)

( * ) Notice: Subject to any disclaimer, the term of this patent is extended or adjusted under 35 U.S.C. 154(b) by 0 days.

(21) Appl. No.: 10/467,747

(22) PCT Filed: Feb. 25, 2002

(86) PCT No.: PCT/JP02/01683

§ 371 (c)(1),
(2), (4) Date: Aug. 13, 2003

(87) PCT Pub. No.: WO02/069553

PCT Pub. Date: Sep. 6, 2002

(65) Prior Publication Data

US 2004/0061540 A1 Apr. 1, 2004

(30) Foreign Application Priority Data

Feb. 27, 2001 (JP) ........................................ 2001-052580

(51) Int. Cl.⁷ ............................................. H03K 21/00
(52) U.S. Cl. ..................... 377/44; 327/151; 327/160; 327/153; 327/161; 327/162; 327/299
(58) Field of Search .................. 327/151, 160, 327/153, 161, 162, 299; 377/44

(56) References Cited

U.S. PATENT DOCUMENTS 4,841,167 A * 6/1989 Saegusa ....................... 327/98

FOREIGN PATENT DOCUMENTS

| JP | 60-224346 | 11/1985 |
| JP | 02-050643 | 2/1990 |
| JP | 08-331189 | 12/1996 |
| JP | 10-313301 | 11/1998 |
| JP | 11-068728 | 3/1999 |

* cited by examiner

Primary Examiner—Margaret R. Wambach
(74) Attorney, Agent, or Firm—Duane Morris LLP

(57) ABSTRACT

A master clock signal source (10) generates a master clock signal having a frequency equal to N times the bit rate of received data, where N is a positive integer. A modulo-N counter (12) counts the master clock signal. An edge detecting circuit (4) detects a transition of the received data from a H level to a L level. A counter (8) counts the master clock signal and resets the modulo-N counter (12) if the count counted during a time period in which three edge representative signals occur is 2N. In accordance with the count in the modulo-N counter 12, a clock generating unit 14 generates a clock signal.

3 Claims, 4 Drawing Sheets

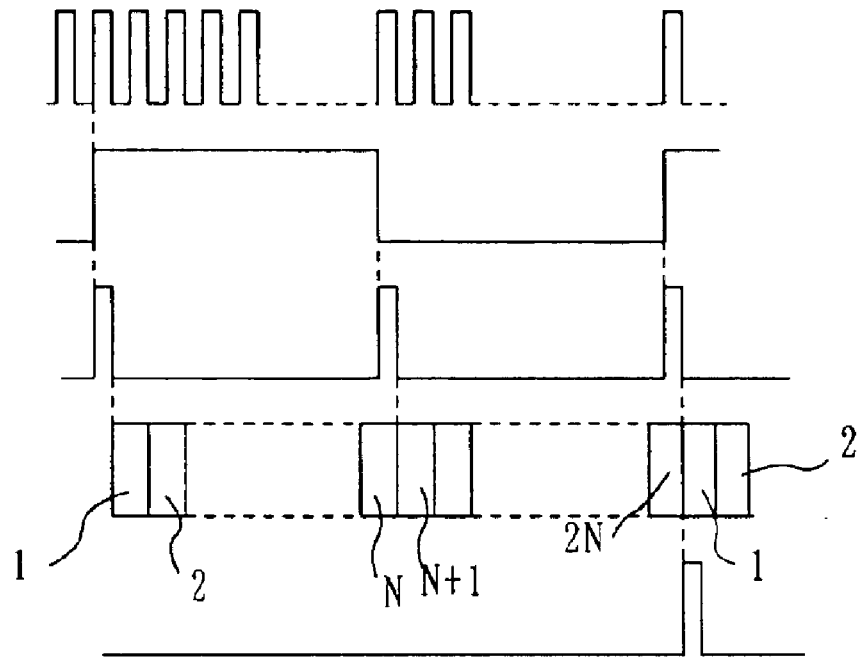
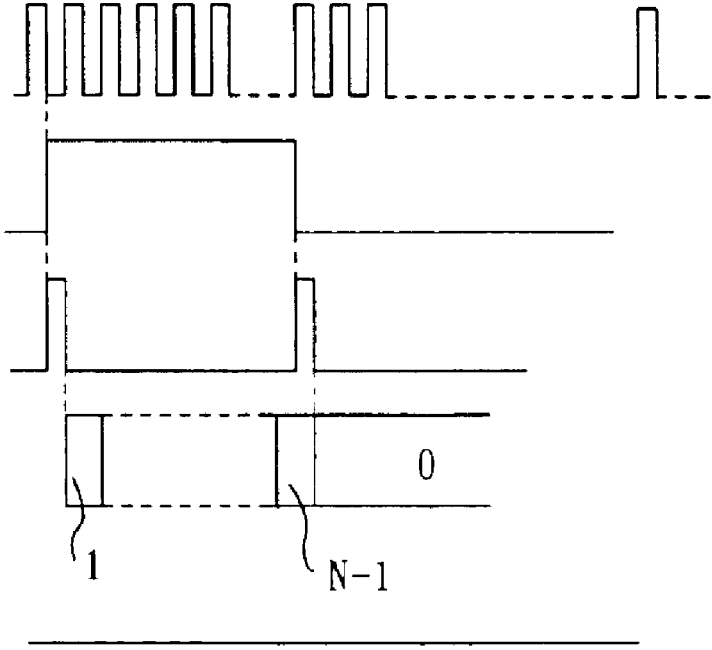

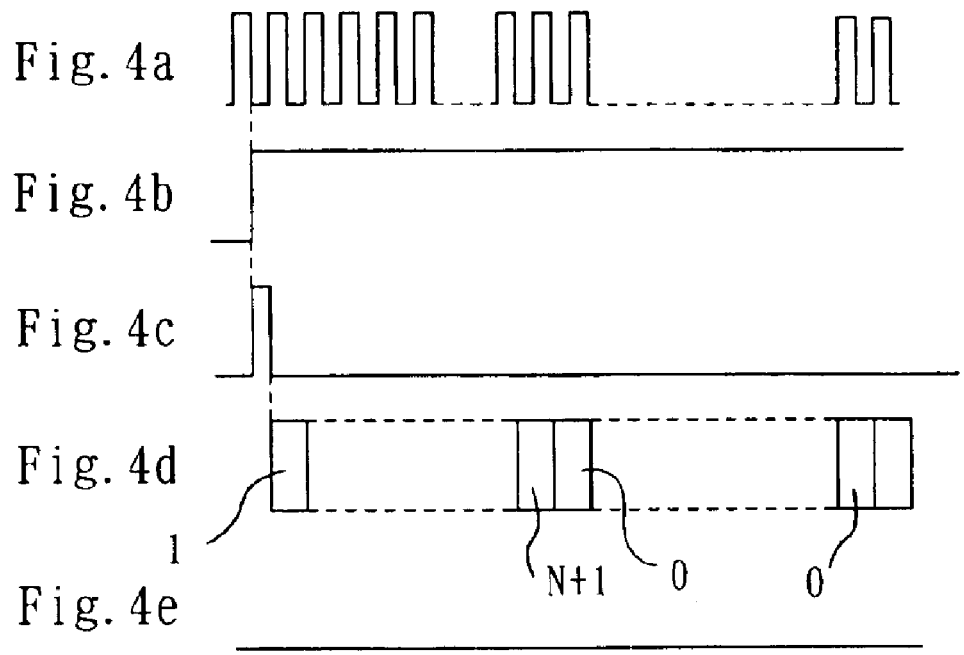
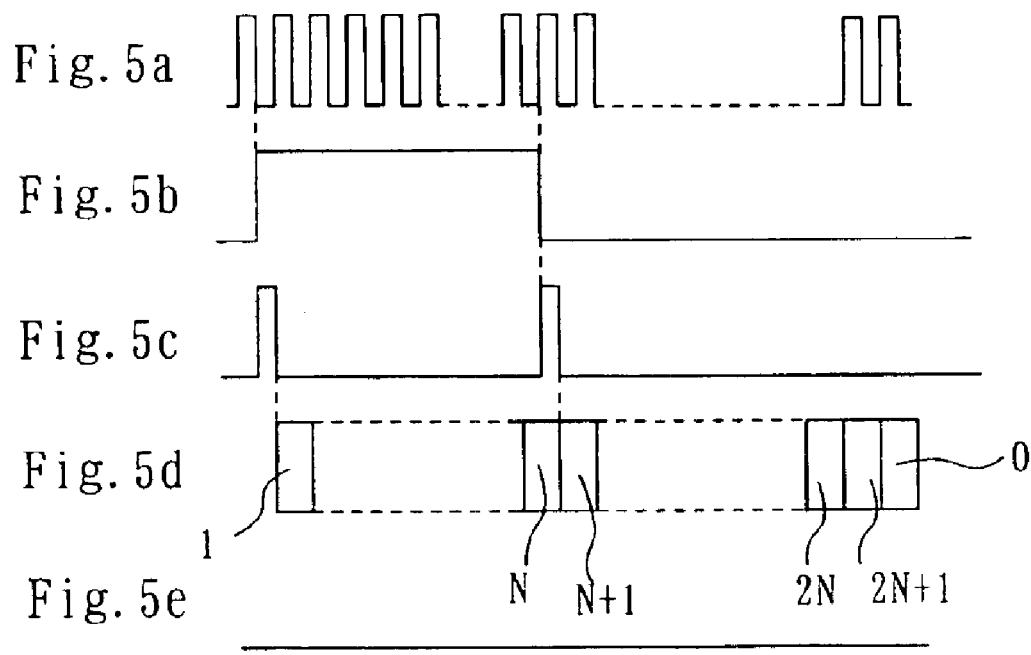

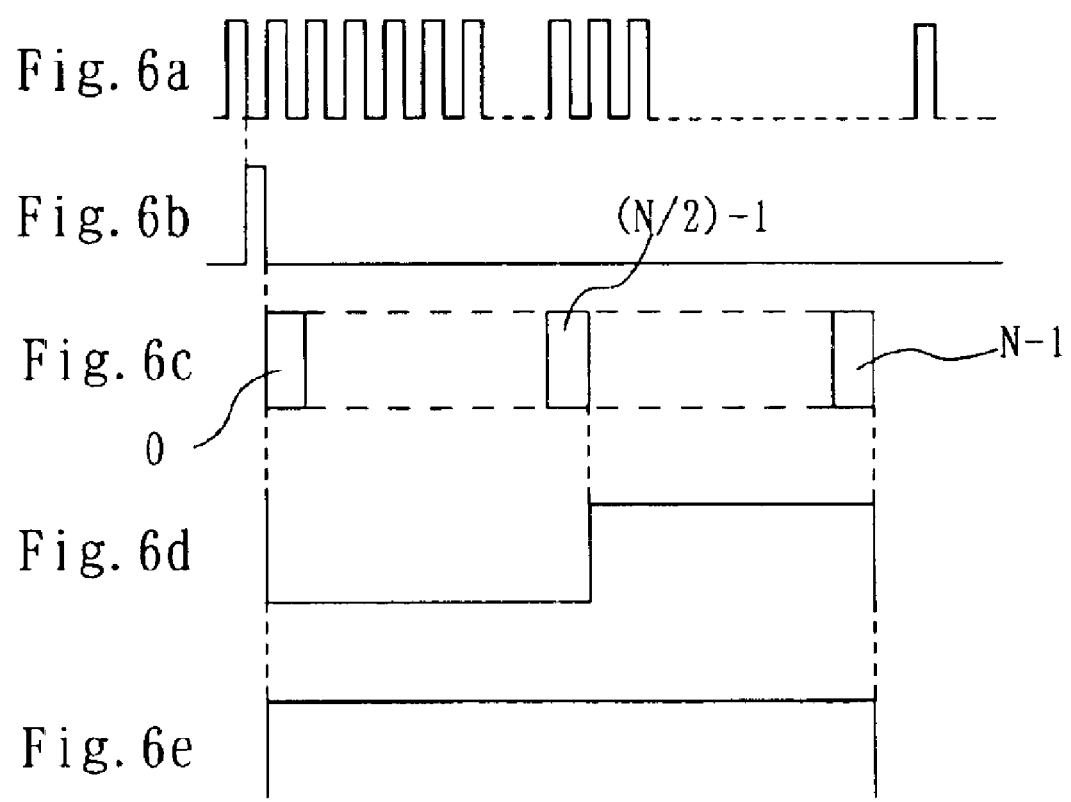

CLOCK REPRODUCTION CIRCUIT

TECHNICAL FIELD

This invention relates to a clock reproducing circuit for reproducing a clock signal from received data.

BACKGROUND OF THE INVENTION

In order to receive bits of digitally transmitted data, synchronization with the respective data bits is required. Reproduction of synchronizing clock signals from information contained in the transmitted data is employed. The arrangement of an example of reproducing circuits is as follows. Received data is differentiated in a differentiation circuit to produce transition pulses responsive to rising of the received data. The transition pulses are inputted to a LC resonant circuit, which generates a resonant signal. The values of a coil and a capacitor forming the resonant circuit are adjusted in such a manner as to provide the resonant signal with given resonant frequency and phase synchronized with the frequency of the transmission rate of the received data. The resonant signal is applied to a comparator, where it is shaped to a pulse signal having a required voltage value. The pulse signal from the comparator is applied to a frequency-divider circuit for frequency-dividing the pulse signal into a signal having a given frequency, which is a clock signal.

This clock reproducing circuit, however, requires adjustment of the values of the coil and capacitor of the LC resonant circuit, requires adjustment for correct resonance, and requires a larger number of circuit components. In order for the resonant circuit to resonate, a pull-in time is required, which worsen response of the circuit.

An object of the present invention is to provide a clock reproducing circuit that requires no adjustment, requires fewer components, and has good response.

DESCRIPTION OF THE INVENTION

A clock reproducing circuit according to the present invention includes a master clock signal source that generates a master clock signal. The master clock signal has a period that is equal to 1/N times as large as one bit period of received data, where N is a positive integer. A first level may be, for example, a H or L level, and a second level may be an opposite level, i.e. a L or H level. A modulo-N counter counts the master clock signals. The modulo-N counter starts counting the master clock signal from its initial value, and starts another counting from the initial value after it counts N pulses of the master clock signal. Edge detecting means detects first to second level transitions or from second to first level transitions of the received data. An edge-representative signal represents risings and failings of the received data. A resetting counter counts the master clock signals. The resetting counter resets the modulo-N counter if the count resulting from counting the master clock signal during a period in which a predetermined number, m, of edge-representative signals occur, is a number, (m−1)N, determined by the number N and the said predetermined number, m, where m is equal to two or greater. That is, the resetting counter resets the modulo-N counter if the number (m−1)N is N when the predetermined number m is 2, or 3N when m is 4. Clock generating means generates a clock signal in accordance with the count in the modulo-N counter.

The period between one edge-representative signal and the next, i.e. the period between a rising and a subsequent falling or between a falling and a subsequent rising of the data, represents a period of the first or second level of the received data. If one bit of the received data is properly received, the resetting counter counts N master clock signal pulses during this period. Accordingly, the counting by the resetting counter of the number determined in accordance with the number N and the predetermined number, two or greater, during a period in which the predetermined number of edge-representative signals occur, indicates that the received data has been received properly without being distorted or affected by noise. Being reset by the resetting counter in this state, the modulo-N counter starts counting the master clock signal in synchronization with the received data being received properly. The clock signal is generated based on the count in the modulo-N counter in the proper receiving condition so that the clock signal synchronized with the received data can be produced. The clock signal generating means repeats generating an output signal, as the clock signal, that assumes the first level, for example, when the modulo-N counter is reset, and assumes the second level when N/2 master clock signals are counted. This clock reproducing circuit requires no LC resonant circuit, requires fewer components, and has nothing to be adjusted. Further, because no resonant circuit is used, this circuit does not require a pull-in time.

The resetting counter may be so arranged as to start counting from the initial value when a first edge-representative signal occurs. In this case, the resetting counter is reset to the initial value if the count is not equal to the initial value plus N at a time when a second edge-representative signal following the first edge-representative signal, occurs, and is reset to the initial value if the count exceeds the initial value plus N before the second edge-representative signal occurs.

The resetting counter may not count N of the master clock signals during a period between the occurrence of the first edge-representative signal and the second edge-representative signal, i.e. during a first or second level period. This occurs when the first or second level period is shorter than the nominal period and, therefore, the data is not received properly. The resetting counter may count greater than N master clock signal pulses before the second edge-representative signal occurs. This occurs when the first or second level period is longer than the nominal period, and therefore, the data is not received properly. This occurs also when one first or second level succeeds another. If the modulo-N counter is reset by the resetting counter in such signal conditions, the count in the modulo-N counter is not synchronized with the nominal received data. Therefore, in order to avoid the resetting of the modulo-N counter by the resetting counter, the resetting counter is reset.

The resetting counter may be so arranged as to be reset if the count is not equal to the initial value plus 2N when a third edge-representative signal subsequent to the second edge-representative signal occurs, and reset to the initial value when the count exceeds the initial value plus 2N before the third edge-representative signal occurs.

It may occur that the count is not equal to the initial value plus 2N when the third edge-representative signal occurs. It occurs when the period during which the data changes from the first level to the second level and, then, returns to the first level, or the period during which the data changes from the second level to the first level and, then, returns to the second level, differs from the nominal period, and, therefore, the data has not been received properly. It may occur that the count exceeds the initial value plus 2N before the third edge-representative signal occurs. It occurs when the period during which the data changes from the first level to the second level and, then, returns to the first level, or the period during which the data changes from the second level to the first level and, then, returns to the second level, is longer than the nominal period, and, therefore, the data has not been received properly. The latter also occurs when a succession of first or second level occurs. In these conditions, the count of the modulo-N counter is not synchronized with the nominal received data. Therefore, as in the previously described case, the resetting counter is reset.

BRIEF DESCRIPTION OF THE DRAWINGS

FIG. 2a illustrates changes of the master clock signal.

FIG. 2b illustrates changes of received data applied to the input terminal 2.

FIG. 2c illustrates changes of the output signal of the edge detecting circuit 4.

FIG. 2d illustrates changes of the counts in the counter 8.

FIG. 2e illustrates changes of the output signal of the counter 8.

FIG. 3a illustrates changes of the master clock signal.

FIG. 3b illustrates changes of received data applied to the input terminal 2.

FIG. 3c illustrates changes of the output signal of the edge detecting circuit 4.

FIG. 3d illustrates changes of the counts in the counter 8.

FIG. 3e illustrates changes of the output signal of the counter 8.

FIG. 4a illustrates changes of the master clock signal.

FIG. 4b illustrates changes of received data applied to the input terminal 2.

FIG. 4c illustrates changes of the output signal of the edge detecting circuit 4.

FIG. 4d illustrates changes of the counts in the counter 8.

FIG. 4e illustrates changes of the output signal of the counter 8.

FIG. 5a illustrates changes of the master clock signal.

FIG. 5b illustrates changes of received data applied to the input terminal 2.

FIG. 5c illustrates changes of the output signal of the edge detecting circuit 4.

FIG. 5d illustrates changes of the counts in the counter 8.

FIG. 5e illustrates changes of the output signal of the counter 8.

FIG. 6a illustrates changes of the master clock signal.

FIG. 6b illustrates changes of the output signal of the counter 8.

FIG. 6c illustrates changes of the count in the modulo-N counter 12.

FIG. 6d illustrates changes of the output signal of the clock generating unit 14.

FIG. 6e illustrates the output signal of the delay circuit 16.

BEST MODE FOR EMBODYING THE INVENTION

Figure 1:
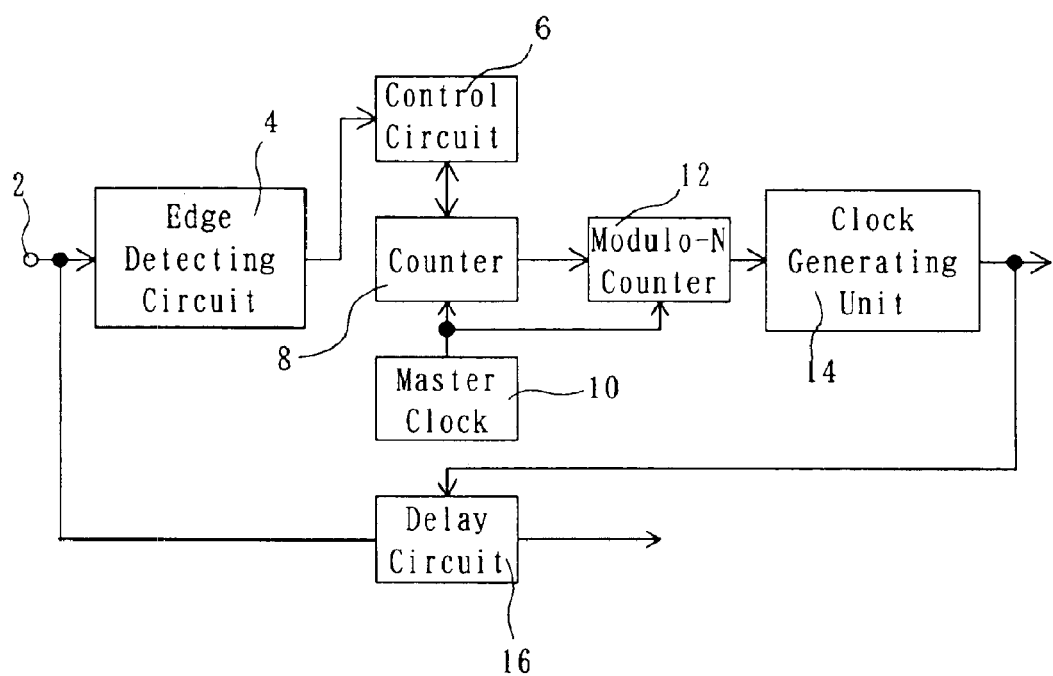
FIG. 1 is a block circuit diagram of a clock reproducing circuit according to one embodiment of the present invention.

As shown in FIG. 1, a clock reproducing circuit according to one embodiment of the present invention has an input terminal 2. Received data like the one shown in FIG. 2b is supplied to the input terminal 2. The received data changes its level between a first, e.g. H (high), level, and a second, e.g. L (low), level. The received data is coupled to an edge detecting circuit 4, which may be formed of, for example, a differentiating circuit. The edge detecting circuit 4 develops an edge-representative signal at times the received data rises and falls, as shown in FIG. 2c.

The edge-representative signal is applied to a control circuit 6, which may be formed of, for example, a CPU or a DSP. In accordance with the edge-representative signal and the count in a resetting counter 8, the control circuit 6 controls the resetting counter 8, as will be described later. The counter 8 increments its count by one each time a master clock signal generated by a master clock signal source 10 rises. The master clock signal has a period equal to one N-th (N being a positive integer) of a period during which the normal received data, e.g. received data free from distortion or influence of noise, is at the H or L level. In other words, the master clock signal has a frequency equal to N times as large as the bit rate of the received data.

The master clock signal is applied also to a modulo-N counter 12. The modulo-N counter 12 repetitively counts pulses in the master clock signal from an initial value, e.g. zero (0), after it counts N master clock signal pulses. The modulo-N counter 12 has its count forced to change to zero (0) when it receives a reset signal from the counter 8.

The count in the modulo-N counter 12 is applied to clock generating means, e.g. a clock generating unit 14. The clock generating unit 14 generates a clock signal having a level changing in accordance with the count in the modulo-N counter 12. This level change will be described later. The clock signal is applied to a delay circuit 16, which receives also the received data from the input terminal. The delay circuit 16 synchronizes the received data with the clock signal. A D flip-flop, for example, may be used as the delay circuit 16.

Referring to FIGS. 2a through 2e, operation of the circuit when receiving nominal data including bits each having a period equal to the bit rate is described.

Let it be assumed that the level of the received data alternates between the L and H levels, as L, H, L, H, ..., as shown in FIG. 2b. During four level changes occurring in response to the risings and failings in the received data, three edge-representative signals occur, as shown in FIG. 2c.

In response to a command given by the control circuit 6 responsive to the first edge-representative signal, the counter 8 starts counting from one (1), as shown in FIG. 2d.

When the second edge-representative signal rises, the count in the counter 8 is equal to N. In other words, during the period in which the received data is at the H level, N master clock signal pulses occurred. Thus, the H-level period can be considered to be normal, and, therefore, the control circuit 6 gives no further command to the counter 8 so that the counter can continue counting.

The count in the counter 8 is equal to 2N when the third edge-representative signal rises. This means that N master clock signal pulses occurred in the L-level period occurring subsequent to the normal H-level period. Therefore this L-level period can be considered to be normal, too. Then, the control circuit 6 causes the counter 8 to provide a reset signal to the modulo-N counter 12, as shown in FIG. 2e.

This reset signal is generated due to the fact that the H level following the L level of the received data is maintained for the normal period, which is followed by the L level maintained for the normal period.

The value 2N is determined based on a predetermined number, three (3), of occurrences of the edge-representative signals, and the value N, and is expressed by (m−1)N where the predetermined number of occurrences of the edge-representative signals is m.

When the reset signal is developed, as shown in FIG. 6b, the modulo-N counter 12 starts counting the master clock shown in FIG. 6a from an initial value of zero (0), and the count is incremented by one (1) from zero (0) as shown in FIG. 6c. From this instant, the clock generating unit 14 changes the level of its output signal to the L level, as shown in FIG. 6d.

When the count in the modulo-N counter 12 reaches (N/2)−1, in other words, when the modulo-N counter 12 counts N/2 master clock signal pulses, the clock generating unit 14 changes the level of its output signal to the H level.

When the count in the modulo-N counter 12 reaches N−1, i.e. when the modulo-N counter 12 counts N master clock signal pulses, the clock generating unit 14 causes its output signal to return to the L level. The output signal of the clock generating unit 14 is applied, as a clock signal, to the delay circuit 16.

The modulo-N counter 12 and the clock generating unit 14 repeat the same operations as described above to generate the clock signal.

As described, the clock signal is generated based on the count in the modulo-N counter 12, which is reset when the H-level and L-level periods are represented by the count N. Thus, the clock signal is in synchronization with the normal received data. The clock signal synchronized with the normal received data is applied to the delay circuit 16, where the timing of the bit of the received data is made coincident with the clock signal, as shown in FIG. 6e.

Next, a case in which the H-level period of the received data is shorter than the N master clock signal pulse period is considered with reference to FIG. 3b.

In this case, as shown in FIG. 3b, when the received data at the H level subsequent to the L level changes its level from the H level to the L level, i.e. when the second edge-representative signal shown in FIG. 3c rises, the count in the counter 8 is smaller than N, e.g. N−1, as shown in FIG. 3d.

The control circuit 6 judges that the count is not equal to the initial value plus N and resets the counter 8 to the initial value of zero (0) so that the counter 8 maintains the 0 value even when the master clock is inputted. Then, as shown in FIG. 3e, the counter 8 does not develop the reset signal. Therefore, it does not occur that a clock signal asynchronous with the received data is generated.

When the next edge-representative signal occurs, the counter 8 starts counting from one (1).

Now, let a case be considered in which the H-level period of the received data is longer than the N master clock pulse period, as shown in FIG. 4b.

As shown in FIG. 4d, before the second edge-representative signal occurs after the edge-representative signal is generated in synchronism with the rising of the received data, the count in the counter 8 reaches N+1, which is detected by the control circuit 6. Then, the control circuit 6 forces the counts in the counter 8 to be zero (0), as shown in FIG. 4d, and causes the counting of the master clock to be stopped.

Accordingly, as shown in FIG. 4e, the counter 8 does not develop the reset signal, so that any clock signal asynchronous with the received data is never generated.

When the next edge-representative signal occurs, the counter 8 starts counting from one (1).

Next, let a case be considered in which the L-level period of the received data is longer than the N master clock signal pulse period while the H-level period corresponds to the N master clock signal pulse period, as shown in FIG. 5b.

In this case, as shown in FIG. 5c, the count in the counter 8 becomes 2N+1 before the third edge-representative signal occurs after the occurrence of the second edge-representative signal. In other words, the count in the counter 8 exceeds the value equal to the initial value plus 2N.

The control circuit 6 detects this and makes the count in the counter 8 zero (0) to thereby cause the subsequent counting of the master clock to be stopped. Accordingly, as shown in FIG. 5e, the counter 8 does not develop a reset signal, which prevents a clock signal asynchronous with the received data from being generated.

The counter 8 re-starts counting from one (1) when the next edge-representative signal is developed.

As described above, the counter 8 provides a reset signal only when the H-level period corresponds to the period of N master clock signal pulses and the L-level period corresponds to the period of N master clock signal pulses. Accordingly, the clock signal can be synchronized with the normal received data without fail.

The present invention has been described as being embodied in an application in which the received data has a level changing from the L level to the H level, returning to the L level, and, then, changing again to the H level. The present invention, however, can be embodied in an application in which the received data has a level changing from the H level to the L level, then, back to the H level and again to the L level. Further, the modulo-N counter 12 may be arranged to be reset when the received data changes its level from the L (or H) level to the H (or L) level and returns to the L (or H) level, or, in other words, when the count in the counter 8 reaches N. Alternatively, the modulo-N counter 12 may be reset when the count in the counter 8 attains an integral multiple of N equal to or greater than 3N. The edge detecting circuit 4, the control circuit 6, the counter 8, the modulo-N counter 12, the clock generating unit 14, and the delay circuit 16 of the clock reproducing circuit may be implemented with software, using a CPU or DSP, for example.

INDUSTRIAL UTILITY

The present invention can be used in digital data transmission, to reproduce a clock signal for use in receiving bits of digitally transmitted data from the data.

What is claimed is:

1. A clock reproducing circuit comprising:
   a master clock signal source for generating a master clock signal pulses having a period equal to 1/N-th times as large as one bit period of normal received data, where N is a positive integer;
   a first counter for iterating operation of counting said master clock signal pulses from an initial state and returning to said initial state when counting N master signal pulses;
   edge detecting means for detecting transitions of received data from a first level to a second level and from the second level to the first level, and generating an edge representative signal each time the transition is detected;
   a second counter for counting said master clock signal, and resetting said first counter when a count in said second counter becomes a number determined based on said number N and a predetermined number equal to or large than two (2) during a time interval during which said predetermined number of edge representative signals occur; and clock generating means for generating a clock signal for said received data, said clock signal assuming a first state when said firm counter counts N/2 of said master clock signal pulses from said initial state and assuming a second state when said first counter counts N of said master clock signal pulses from said initial state.

2. The clock reproducing circuit according to claim 1 wherein said second counter starts counting from an initial value when a first edge representative signal occurs, is reset to said initial value if the count therein is not equal to said initial value plus N at a time when a second edge representative signal occurs subsequent to said first edge representative signal, and is reset to said initial value if the count therein exceeds said initial value plus N before the second edge representative signal occurs.

3. The clock reproducing circuit according to claim 2 wherein said second counter is reset to said initial value if the count therein is not equal to said initial value plus 2N at a time when a third edge representative signal occurs subsequent to said second edge representative signal, and is reset to said initial value if the count therein exceeds said initial value plus 2N before said third edge representative signal occurs.

* * * * *